United States Patent [19]

Curtis

[11] Patent Number: 5,785,388
[45] Date of Patent: Jul. 28, 1998

[54] SEAT BELT PILLOW

[76] Inventor: Phillip Curtis, 15 Beaufort La., Clayfield, Queensland, 4011, Australia

[21] Appl. No.: 817,986

[22] PCT Filed: Oct. 12, 1995

[86] PCT No.: PCT/AU95/00657

§ 371 Date: Apr. 25, 1997

§ 102(e) Date: Apr. 25, 1997

[87] PCT Pub. No.: WO96/13401

PCT Pub. Date: May 9, 1996

[30] Foreign Application Priority Data

Oct. 26, 1994 [AU] Australia ................ PM9014

[51] Int. Cl.[6] ................................ A47C 31/00
[52] U.S. Cl. ............ 297/482; 297/397; 297/DIG. 6
[58] Field of Search ............... 297/DIG. 6, 482, 297/487, 488, 393, DIG. 1, DIG. 3, 452.41, 397, 219.1, 220, 228.13, 219.12; 280/751, 801.1, 805; 5/639, 636

[56] References Cited

U.S. PATENT DOCUMENTS

| | | |
|---|---|---|
| 3,327,330 | 6/1967 | McCullough .................. 5/337 |
| 3,891,274 | 6/1975 | Cook et al. .................. 297/482 |
| 3,957,282 | 5/1976 | Finnigan .................... 297/482 |
| 4,060,863 | 12/1977 | Craig . |
| 4,285,081 | 8/1981 | Price . |
| 4,679,262 | 7/1987 | Davis et al. . |
| 4,736,477 | 4/1988 | Moore . |
| 4,776,049 | 10/1988 | Perron . |
| 4,779,930 | 10/1988 | Rosen ................... 297/397 X |
| 4,838,611 | 6/1989 | Talaugon . |
| 5,005,866 | 4/1991 | Reedom ............... 297/482 X |
| 5,016,915 | 5/1991 | Perry .................... 297/482 |
| 5,154,477 | 10/1992 | Lacy . |
| 5,216,772 | 6/1993 | Clute . |
| 5,330,255 | 7/1994 | Stawick ............... 297/397 X |
| 5,335,957 | 8/1994 | Golden ................. 297/482 |
| 5,421,614 | 6/1995 | Zheng ................ 297/482 X |
| 5,468,020 | 11/1995 | Scime ............... 280/801.1 X |
| 5,584,536 | 12/1996 | White .................. 297/482 |

FOREIGN PATENT DOCUMENTS

| | | | |
|---|---|---|---|
| 0021 628 | 7/1981 | European Pat. Off. ......... B60N 1/12 |
| 2 516 771 | 5/1983 | France ................ A47C 20/00 |
| 2 648 999 | 1/1991 | France ................ A47G 9/00 |
| 2 198 341A | 6/1988 | United Kingdom ..... A47G 27/08 |
| 2 246 292 | 1/1992 | United Kingdom ...... A47C 7/38 |
| W088/00848 | 2/1988 | WIPO .................. A62B 35/04 |
| W091/12978 | 5/1991 | WIPO .................. B60R 22/10 |

*Primary Examiner*—Milton Nelson, Jr.
*Attorney, Agent, or Firm*—D. Peter Hochberg; Mark Kusner

[57] ABSTRACT

A seat belt pillow having a web and two arms of uniform thickness in a non-compressed state, each of the arms having an external surface with a pair of spaced attachment zones for insertion of a vehicle seat belt therebetween, and at least one attachment patch for attachment to the respective zones on an associated arm, whereby the spaced attachment zone and the attachment patch provide a passage for a vehicle seat belt to move freely through the passage relative to the pillow.

18 Claims, 6 Drawing Sheets

SEAT BELT PILLOW

FIELD OF THE INVENTION

THIS INVENTION relates to a seat belt pillow for use with passenger restraint seat belts to correctly position the passenger in relation to the seat belt.

BACKGROUND OF THE INVENTION

Although the most common seat belt configuration currently utilised by automotive manufacturers is of the lap and sash type (i.e. incorporating a lap belt and a sash belt), other configurations include simply the lap configuration or the full harness. The lap seat belt configuration which provides limited occupant restraint simply overlies the waist of the occupant and is usually found in the middle of rear bench seats of automobiles. The full harness configuration consists of two vertical strap members which overlie the shoulders and connect with a lap seat belt member.

Seat belts of the lap and sash type are now mandatory safety items in all front and rear seats of automobile and other passenger vehicles. Most passengers who tend to fall asleep on long journeys invariably tend to lean either into or away from the sash belt.

In a collision, a tendency to lean forwardly or into the sash belt facilitates the restraining function of the seat belt as the body of the passenger maintains contact with the overlying sash belt.

The proper functioning of the seat belt however is compromised in passengers who tend to lean away from the sash belt. This is especially common with young children who tend to flop out of the sash belt when asleep. In the most extreme situation, there is a possibility of a young child or small adult slipping out of an incorrectly worn seat belt as a consequence of a sudden braking or stopping force.

In the case of the full harness configuration, optimal protection is obtained provided the seat belt is worn correctly. There is however a possibility of whip lash or other neck injuries occurring due to the fact that the shoulders are firmly restrained leaving the head free to move rearwardly or laterally.

There are pillows currently available on the market which fit around the sleeping passenger's neck. These pillows which are generally of the inflatable variety, are mainly for passenger comfort and do not purport to be safety devices. In this respect they do not encourage passengers to lean in either direction nor are they meant to be used in conjunction with a seat belt.

There are number of examples of cushions or headrests for attachment to seat belts and, in particular, the sash belt which comprise a cushion being folded around the sash belt or the sash belt being inserted between opposed parts of the cushion. In each case, the cushion is attached to the sash belt by appropriate releasable fastening means such as a hooked pile fastener assembly located on adjacent ends of the cushion or headrest. The cushion may then be moved along the seat belt as may be required by the user. Examples of such cushions or headrests include Canadian Patent 2083782, U.S. Pat. No. 5,005,866, U.S. Pat. No. 4,693,495, U.S. Pat. No. 4,348,037, British Patent 2281188, French Patent 2652048, European Patent 311923, U.S. Pat. No. 4,795,190, PCT International Publication WO88/00848, U.S. Pat. No. 4,699,401, Australian Patent 55252/86, British Patent 2169187, German Patent 3434010, British Patent 2133970, German Patent 3232946, German Patent 3202247, German Patent 3150489, Soviet Union Patent 872336 and German Patent 2725850.

References of particular interest include:

(I) German Patent 3202247 which is a fabric sheath with a padded roll along each edge which is designed to protect the neck and/or chest of an occupant against the sharp edges of a seat belt fixed at an angle to the shoulder.

(ii) German Patent 3434010 refers to seat belt padding which is applied to critical areas of the seat belt. In a preferred embodiment, strips of cushioning material such as fibre matting, cotton wool, hairs or polystyrene foam are contained within an inner and outer layer of woven or knitted natural or synthetic fibre. Such cushioning strips may be applied as a sheath to the seat belt and may be closed by press button or by hook and loop fastening means. The advantages claimed in this reference are that the seat belt padding prevents uncomfortable pressure on the shoulders and provides extra protection in the case of collision.

(iii) German Patent 3150489 refers to a cushion which is applicable at an optional location of the seat belt assembly and is adjustable along the seat belt strap. In a preferred embodiment, the cushion comprises a shock-absorbing core surrounded by sheathing which is fitted on a channel-like strap guide provided with a guide slot.

(iv) European Patent 311923 refers to a seat belt cushioning device comprising a pad member of soft or elastomeric material and a supporting member. The supporting member has a rear surface with hinge like connectors on a side opposite the pad member. The hinge like connectors slidably connect the pad supporting member to the seat belt. The pad member has a protective cover and is releasably disengageable from the seat belt. This reference states that the cushioning device functions as a seat belt shock absorber which dampens contact pressure between the seat belt and the shoulder or point of greatest stress during an impact.

(v) French Patent 2652048 refers to a seat belt cushion to protect the collar bone in vehicle accidents comprising flexible material held in position along the strap of a seat belt the position of which is adjustable to accommodate different occupants. The seat belt cushion protects the collar bone in the case of an impact. The seat belt cushion includes a flexible component between the drivers shoulder region and the seat belt which is capable of deforming under the effect of the restraint by the seat belt in the event of a collision. The seat belt cushion also comprises a damping component and a gripping component which holds the damping component in position on the seat belt strap.

(v) Soviet Union Patent 872336 refers to a head rest which can also be secured to the back of a seat or can be fastened to the sash portion of a sash and lap seat belt. Elastic bushes are fitted inside the head rest enabling it to fit over bars on the back of the seat. During a long journey, the head rest can be removed from the back of the seat and attached to the seat belt by means of snap fasteners and can be moved along the belt to the most convenient position for the passenger.

(vi) U.S. Pat. No. 4,693,495 refers to a cushion which may be mounted on a shoulder belt for softening the pressure of the belt on the user and comprises a foam pad encased in a fabric cover with hook and loop fastening means along opposite edges of the cover so that it may be removed from the shoulder belt. Stitching connects the opposite ends of the cover along a central fold line to assist the user in folding the cushion over the shoulder belt while permitting the mid section of the cushion to comfortably contact the user. The advantage of this device appears to be the provision of greater comfort to the wearer of a seat belt.

(vii) PCT International Publication WO88/00848 refers to a cushioning device for cushioning frictional contact between the edge of a portion of a seat belt strap and a portion of the body of a user comprising a first component and a second component arranged to be connected together at opposed longitudinal edges via connection means. The advantage of this device is stated to be improved user comfort; and (viii) U.S. Pat. No. 4,063,778 refers to an individual personalised body restraining device for the occupant of a seat of any fast moving conveyance. The device is not a seat belt in the conventional sense but includes in its basic configuration the protective elements of a seat belt, two shoulder straps, chest shield, head and chin guard with a head rest and an optional stomach guard. The assembly includes easily adjustable, is quickly attachable and detachable means of fastening it to secure the occupants of the conveyance.

Reference also may be made to U.S. Pat. No. 4,838,611 which refers to a car seat pillow which is intended for use with a child's car seat and not intended for use with an adult vehicle seat belt or harness. The child's car seat is equipped with a pair of shoulder straps which are anchored to the car seat and extend in a forward and downward direction over the shoulders and chest of the child.

The pillow of U.S. Pat. No. 4,838,611 is only intended for use in a fixed position in relation to the child's card seat as may be required for a particular user. The pillow includes side cushions and a neck cushion. The underside of each of the side cushions includes a tether strap which is in the form of a loop which encloses an adjacent shoulder strap and closed by a VELCRO fastener. The use of the tether strap and VELCRO fastener means that when the shoulder strap is enclosed by the tether strap, the result is that the shoulder strap 19 is firmly and immovably retained by the tether strap. This is in keeping with the design of the cushion which means that the cushion is fixed and immovably anchored to the child's car seat in a single position only.

It would appear from the above prior art that numerous simple and complex devices have been developed to provide for the comfort and safety of passengers in vehicles. These devices are either so simple (e.g. U.S. Pat. No. 4,693,495 and PCT International Publication WO88/00848) that they provide a negligible contribution to the safety of the occupants or they are highly complex and individually tailored to suit the occupant (e.g. U.S. Pat. No. 4,063,778) which means they are expensive to manufacture or complicated in construction. The pillow of U.S. Pat. No. 4,838,611 is only capable of a single function, i.e. attachment to a child's car seat in a single non-variable position.

Additional disadvantages of the abovementioned prior art include the following:

(a) the conventional seat belt pillows are not designed to inhibit whiplash due to unrestrained lateral or rearward movement of the head during collision or impact;

(b) the conventional seat belt pillows are not designed to inhibit the tendency of small children to fall out of the sash seat belt when they are asleep;

(c) the conventional seat belt pillows are for the most part capable of being attached only to a single seat belt strap and this means that such seat belt pillows are unsuitable for attachment to the harness seat belt assembly described above;

(d) conventional seat belt pillows when used as head rests or in regard to specific protection for the collarbone or neck by being freely attached to an adjacent seat belt would often slide past the shoulder of the passenger so that often the pillow would not stay permanently in the desired position; and (e) conventional seat belt pillows would often require the employment of additional attachment means such as collarbone or neck by being freely attached to an adjacent seat belt would often slide past the shoulder of the passenger so that often the pillow would not stay permanently in the desired position; and (f) conventional seat belt pillows would often require the employment of additional attachment means such as fasteners or buckles which would have to be attached to the seat belt to inhibit undesired movement of the pillow from the position of interest. The employment of such fasteners or buckles was undesirable in that the such fasteners or buckles when attached to the seat belt can interfere with the effective safety operation of the seat belt. The employment of additional fasteners such as buckles also added to the cost of the seat belt pillow by virtue of the more complicated structure;

(g) conventional seat belt pillows do not provide an arrangement where the seat belt may move freely through the attachment locations to the pillow. This means that conventional seat belt pillows are no adjustable.

SUMMARY OF THE INVENTION

It is an object of the invention to provide a seat belt pillow which may alleviate the aforementioned disadvantages of the prior art.

The invention therefore provides a seat belt pillow having a web and two arms to provide the pillow with a channel shape having substantially a uniform thickness in a non-compressed state, each of said arms on an external surface thereof having a pair of spaced attachment zones for insertion of a vehicle seat belt therebetween, there also being provided one or more attachment patches for attachment to respective zones on an associated arm whereby the combination of spaced joining the arms of the pillow which are of a greater cross sectional area.

In the V-shaped pillow, the web is located at an apex portion of the V. In the W-shaped pillow, the web may be located at apex portions of the W. In the C- and U-shaped pillow, the web may be located between the arms of the C- and U-. In the H-shaped pillow, the web may be located in a cross bar portion joining both arms of the H.

Suitably the web is adapted to snugly support the back of the neck and/or head of the occupant.

Preferably the attachment patch incorporates corresponding attachment zones or strips for engagement with the spaced attachment zones or strips on each arm of the pillow. More preferably the corresponding attachment strips are located on opposed edges of the attachment patch.

The attachment patch may comprise various alternative forms such as being entirely releasable from the associated arm or being in the form of an attachment flap being permanently attached to an associated arm suitably along an edge portion thereof and having another edge portion releasably attached to the associated arm. Alternatively, a number of attachment patches may be used for one arm such as being in the form of spaced attachment loops.

While any suitable fastening means may be utilised between the attachment strips of each arm of the pillow and the corresponding strips of the attachment patch, it is preferred that such fastening means may comprise a hook and loop fastening means such as that sold under the Registered Trade Mark "VELCRO". Most preferably the attachment strips on each arm comprise a plurality of hooks and the corresponding strips comprise a plurality of loops. However, it will be appreciated that any other type of fastening means may be utilised such as ties, zips, press studs, slides, buttons or straps.

The releasable attachment means may be used with either right hand sided or left hand sided lap and sash type seat belts. In use with harness type seat belts, the releasable attachment means may be used to enclose both vertical straps of the harness seat belt.

Alternatively, the pillow may be attached directly to a fabric covered seat by means of the attachment strips without any attachment to a seat belt.

The seat belt pillow of the invention may be encased in a removable cloth or fabric covering for cleaning purposes. The covering may also comprise leather or upholstery vinyl to match the general upholstery of the cabin of the vehicle.

If desired, the seat belt pillow may be an integral part of the design of the vehicle seat belt or may be customised to suit the particular shape and size of the relevant occupant.

BRIEF DESCRIPTION OF THE DRAWINGS

To assist with understanding the invention, reference will now be made to the accompanying drawings, which show one example of the invention, in which.

DETAILED DESCRIPTION

Figure 1:
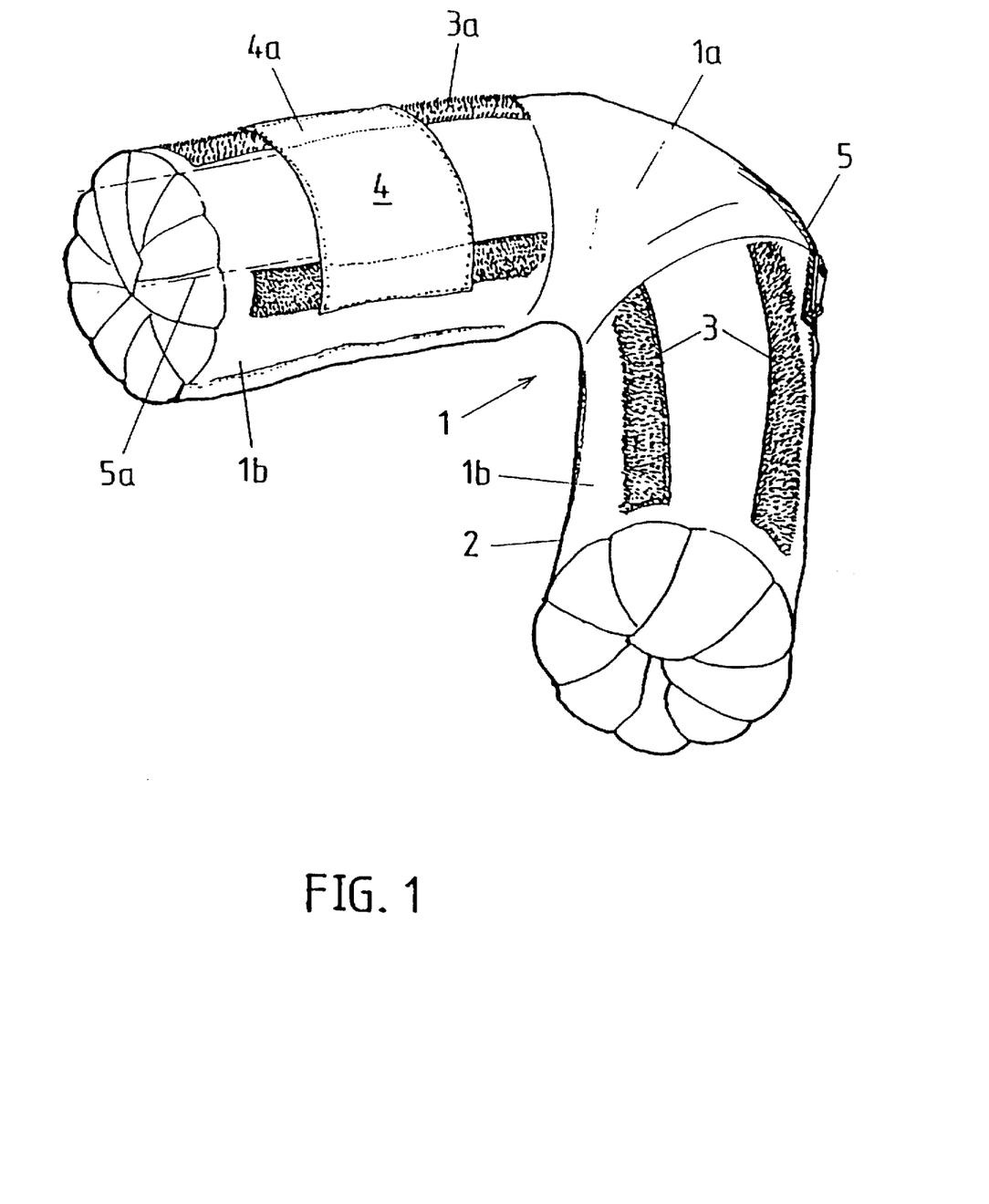
FIG. 1 shows a perspective view of the seat belt pillow according to this invention.

Referring to FIG. 1, it can be seen that a V-shaped seat belt pillow 1 according to the invention may be encased in a removable fabric cover 2. In this embodiment, there is a web 1a of reduced cross sectional area between adjacent arms 1b to support the head and/or neck of a passenger. In an alternative embodiment, the web may not be of a reduced cross sectional area but may be of the same cross-sectional thickness as the arms. A zipped aperture 5 is incorporated in the fabric cover 2 for removal and cleaning purposes. Attachment strips 3 in the form of a plurality of loops 3a are attached to fabric cover 2 on each arm of the V shaped seat belt pillow and are used with an attachment patch 4 having attachment strips 4a of a plurality of hooks (not shown) to enclose the sash of a seat belt 5a shown in phantom.

Figure 1A:
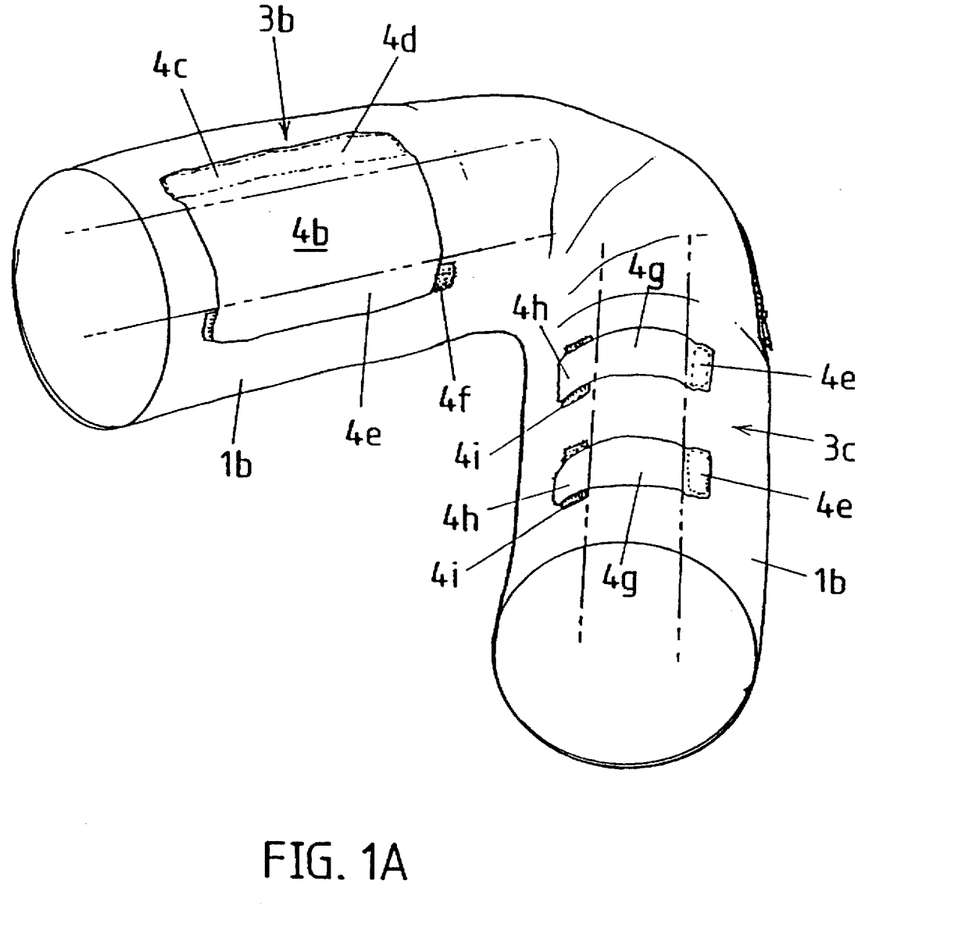
FIG. 1A shows an alternative form of a releasable attachment means to that shown in FIG. 1.

In relation to FIG. 1A, an alternative form of releasable attachment means 3b is shown on one arm 1b which comprises an attachment flap 4b having an edge portion 4c which is permanently stitched by stitching 4d or other suitable fastening means which is preferably of a permanent nature. The attachment flap may also have another edge portion 4e which is releasably fastened to arm 1b by fastening means of a releasable nature. This may include, for example, edge portion 4e having a plurality of hooks which engages with a mating attachment strip 4f on arm 1b having a plurality of loops.

In another alternative form of releasable attachment means 3c there is shown on the other arm 1b spaced attachment loops 4g which are sewn or stitched onto arm 1b or otherwise permanently fastened to arm 1b at 4e and which are releasably fastened to arm 1b at 4h by a plurality of hooks engaging a plurality of loops on attachment strip 4i or other form of releasable fastening means.

Figure 2A:
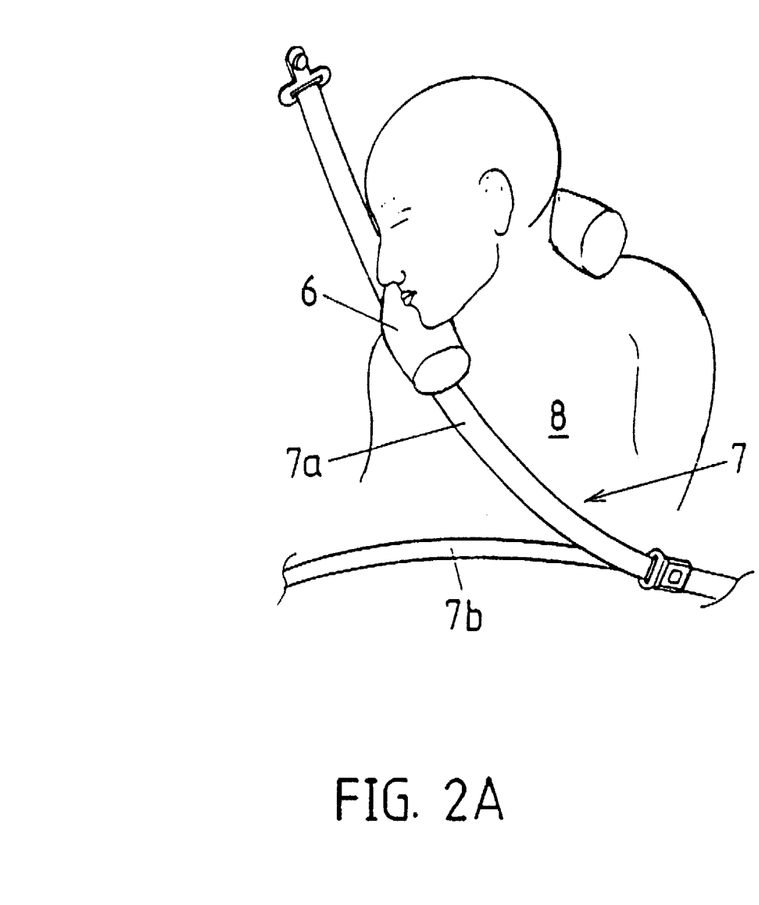
FIGS. 2A and 2B show a schematic representation of the seat belt pillow in use with seat belts of the lap and sash and full harness configurations, respectively.
Figure 2B:
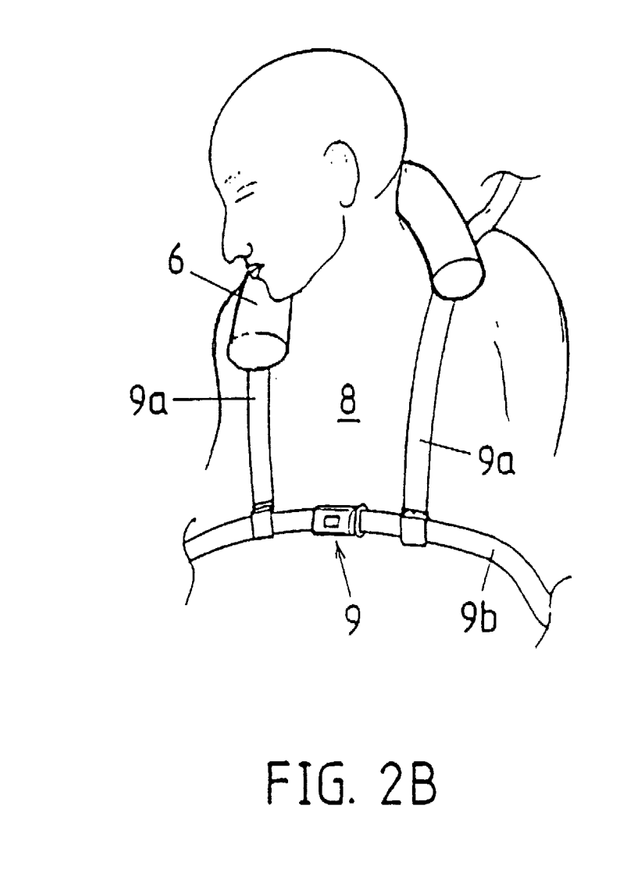

Referring to FIG. 2A, a V-shaped seat belt pillow 6 is shown in operation with a lap and sash seat belt assembly 7 including a sash belt 7a and lap belt 7b. FIG. 2B shows the V-shaped seat belt pillow 6 in use with a full harness seat belt assembly 9 which includes parallel belts 9a and lap belt 9b.

In use with the lap and sash seat belt assembly 7, the seat belt pillow 6 is attached to the upper part of the sash belt 7a.

In use with the full harness seat belt 9, the seat belt pillow 6 is attached to respective upper portions of the vertical straps 9a of the harness.

In both the above seat belt configurations, the passenger 8 is shown using the seat belt pillow while occupying a right hand side seat.

In the position shown in FIG. 2A, it will be appreciated that due to the fact that lap belt 7a is usually taut, that effective support is provided for the neck on both sides thereof. In this situation, the arm of the pillow 6 which is unattached to the seat belt will bear against a vehicle seat or other vehicle structure.

Figure 3:
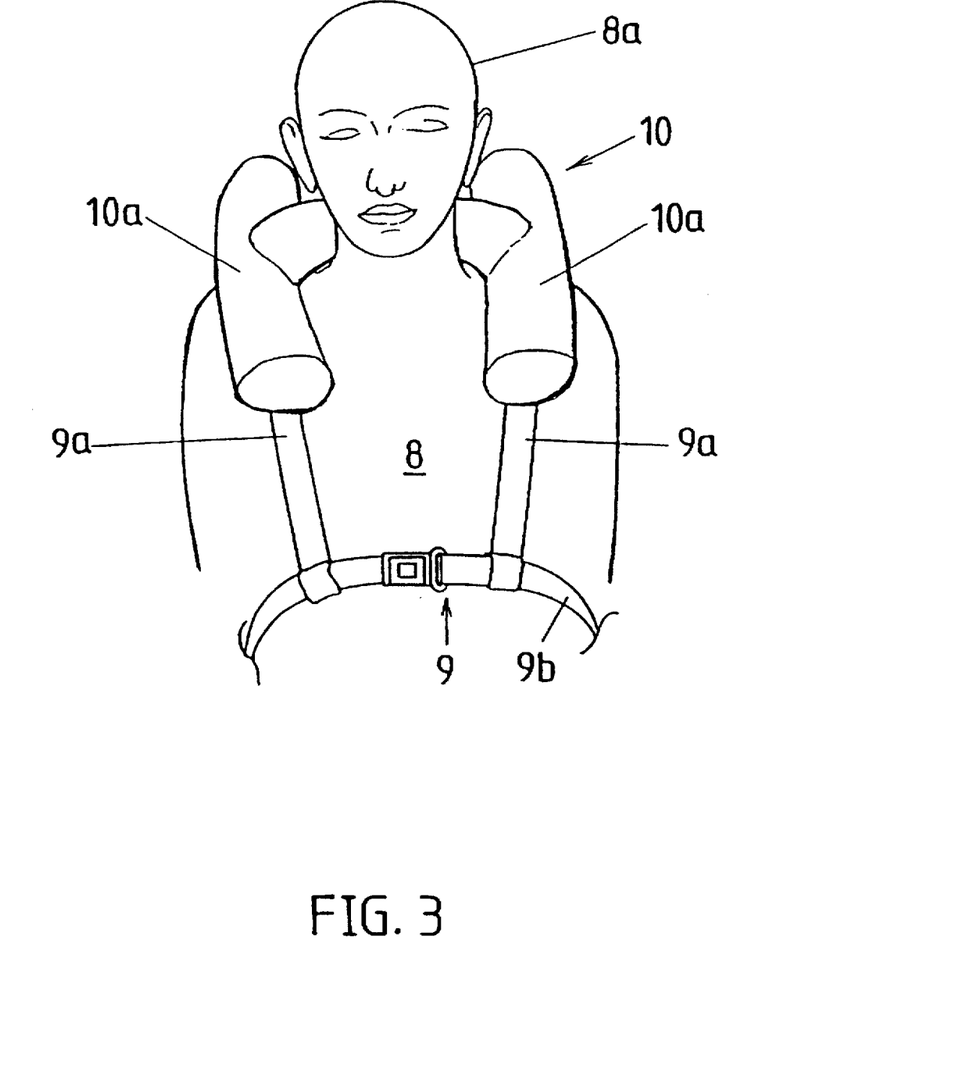
FIG. 3 shows a schematic representation of an H-shaped seat belt pillow in use with a racing harness seat belt.

Referring to FIG. 3, an H-shaped seat belt pillow 10 is shown in operation with both vertical straps 9a of a harness seat belt, 9.

In use, both arms 10a of the seat belt pillow 10 is attached to the upper portions of both vertical straps 9a of the harness. Although this embodiment does not encourage the passenger 8 to lean towards either vertical strap 9a, it does ensure that the position of the passenger's head 8a is centrally positioned between both arms 10a of the seat belt pillow 10 and is supported by web 10b.

Figure 4A:
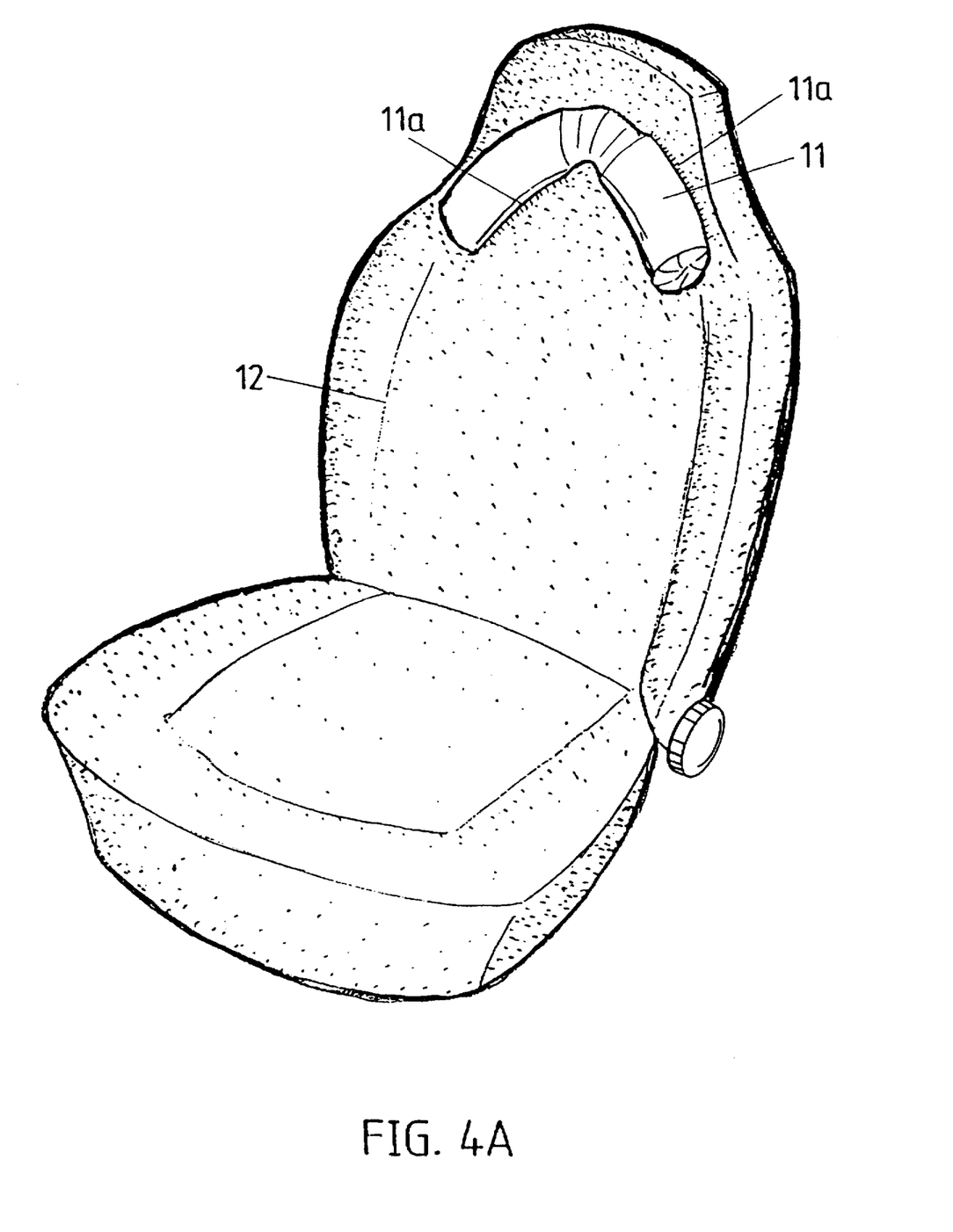
FIG. 4A shows a representation of a V-shaped seat belt pillow directly attached to a seat.

Referring to FIG. 4A, a V-shaped seat belt pillow 11 is shown attached directly to a seat 12, by means of attachment strips partially shown by 11a. It will be obvious that such application will only be possible where the seat 12 is covered with a suitable fabric surface.

Figure 4B:
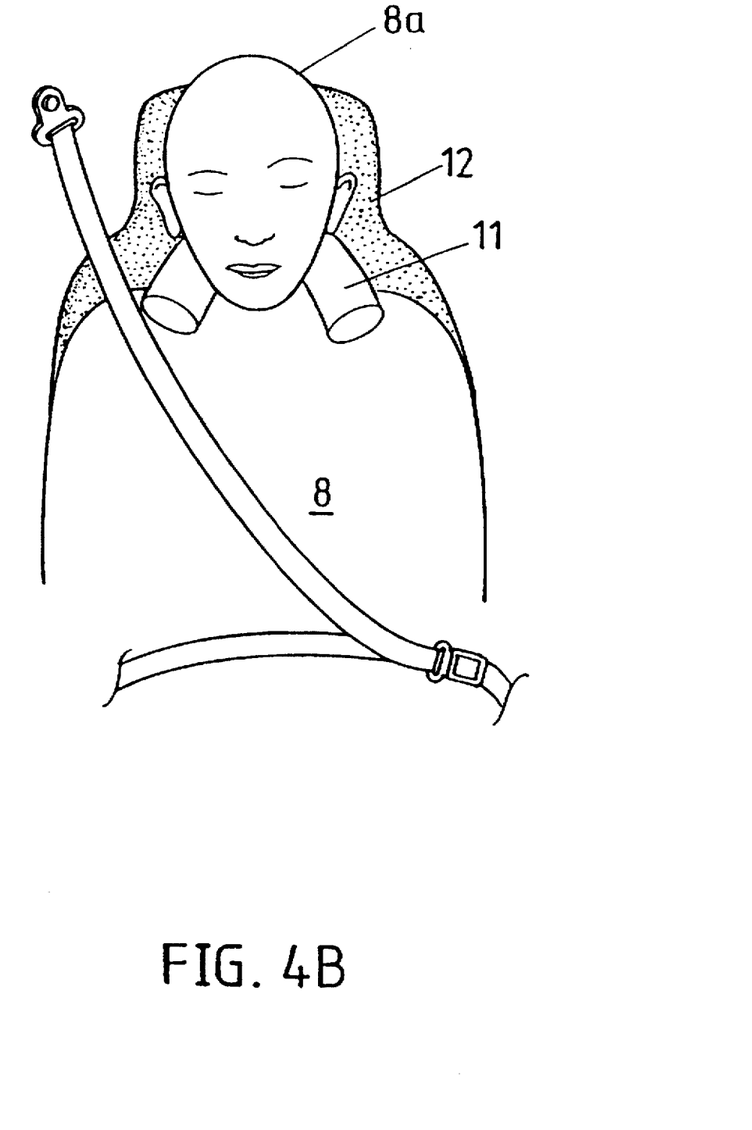
FIG. 4B shows the V-shaped seat belt pillow of FIG. 4A in use.

Referring to FIG. 4B, which shows the operation of the pillow 11 as shown in FIG. 4A, it will be appreciated that the most significant function of the pillow 11 in this position is to support the head 8a and neck of passenger 8.

It will be evident to the skilled reader that seat belt pillow 11 in this position, as with the position of the H-shaped seat belt pillow 10 of FIG. 3 also softens the impact of a sudden force due to an unexpected collision or impact which may be detrimental to the neck of passenger 8.

It will be appreciated from the above preferred embodiment that the seat belt pillow of the invention has the following advantages over the prior art described previously:

(A) The pillow of the invention is movable along the vehicle seat so that it can be adjusted by the user in a variety of different positions as shown in FIGS. 2A, 2B, 4A and 4B so that the pillow is extremely versatile in use;

(B) The pillow of the invention would be more effective in inhibiting whiplash due to unrestrained rearward movement;

(C) It may be used independently of the seat belts in being attached directly to the vehicle seat if such seat is formed form a suitable fabric;

(D) In operation, the seat belt may move freely through the attachment locations of the pillow. This is advantageous when the passenger is asleep for adjustment purposes;

(E) The pillow of the invention offers suitable head and neck support throughout its length by being of uniform thickness;

(F) The attachment patch can be angled across each attachment strip if desired to vary the position so that it firmly contacts the neck of the user;

(G) By the attachment patches being removable, the VELCRO attachment straps may attach the pillow directly to a cloth car seat if desired;

(H) Unlike U.S. Pat. No. 4,838,611, the pillow of the invention, by having the seat belt freely movable through the pillow, means that the pillow cannot be locked or over-tightened in position. This also would not effect retractability of the seat belt which would be the case if the pillow was firmly locked in position;

(I) It will inhibit the tendency of a child to fall out of a seat belt when the child is asleep due to pressure being applied to both sides of the neck to thereby encourage the child to sleep with the seat belt in the correct restraining position;

(J) When one arm of the pillow is attached to a single seat belt (e.g. a lap belt), the other arm without its associated attachment patch, may be attached directly to a cloth vehicle seat giving firm support in to locations in the head and neck; and (K) The angle of the pillow in relation to the seat belt may be varied if desired by extending the attachment strips as shown in FIG. I not only for the sake of comfort but also for different users.

I claim:

1. A seat belt pillow having a web and two arms to provide the pillow with a channel shape having substantially a uniform thickness in a non-compressed state, each of said arms on an external surface thereof having a pair of spaced attachment zones for insertion of a vehicle seat belt therebetween, there also being provided at least one attachment patch for attachment to respective zones on an associated arm whereby the combination of spaced attachment zones and the adjacent attachment patch provides a passage for the vehicle seat belt which moves freely through said passage in use relative to the pillow.

2. A seat belt pillow as claimed in claim 1 which is C-shaped.

3. A seat belt pillow as claimed in claim 1 which is H-shaped.

4. A seat belt pillow as claimed in claim 1 wherein the attachment patch is in the form of an attachment flap permanently attached to an associated arm on one edge portion thereof and releasably attached to the associated arm on another edge portion.

5. A seat belt pillow as claimed in claim 1 wherein the seat belt pillow is encased in a removable cloth or other fabric covering.

6. A seat belt pillow as claimed in claim 1 wherein the seat belt pillow is comprised of polyurethane foam material.

7. A seat belt pillow as claimed in claim 1 wherein the seat belt pillow is an inflatable vinyl bladder.

8. A seat belt pillow as claimed in claim 1 which is U-shaped.

9. A seat belt pillow as claimed in claim 1 which is V-shaped.

10. A seat belt pillow as claimed in claim 1 wherein the seat belt pillow is an inflatable plastic bladder.

11. A seat belt pillow as claimed in claim 1 wherein the attachment patch also includes corresponding attachment zones for engagement with the spaced attachment zones on the associated arm.

12. A seat belt pillow as claimed in claim 1 wherein corresponding attachment strips are located on opposed edges of the attachment patch.

13. A seat belt pillow as claimed in claim 1 wherein there are provided a plurality of attachment patches for attachment to an associated arm.

14. A seat belt pillow as claimed in claim 13 wherein said attachment patches are in the form of attachment loops permanently attached to the associated arm on one side and releasably attached to the associated arm on another side.

15. A seat belt pillow as claimed in claim 1 wherein the spaced attachment zones comprise spaced elongate strips.

16. A seat belt pillow as claimed in claim 15 wherein said spaced attachment strips comprise fastening means in the form of a plurality of loops.

17. A seat belt pillow as claimed in claim 15 wherein the corresponding attachment strips include fastening means in the form of a plurality of hooks.

18. A seat belt pillow as claimed in claim 11 wherein the corresponding attachment zones are located on opposed edges of the attachment patch.

* * * * *